United States Patent [19]

Szejtli et al.

[11] 4,365,061
[45] Dec. 21, 1982

[54] INCLUSION COMPLEXES OF CYCLODEXTRINS AND STRONG INORGANIC OXY-ACIDS AND PROCESS FOR THEIR PREPARATION

[75] Inventors: Jozsef Szejtli; Zsuzsanna Budai; Gabriella Pap nee Imrenyi; Andras Kerekes, all of Budapest, Hungary

[73] Assignee: Chinoin Gyogyszer es Vegyeszeti Termekek Gyara R.T., Budapest, Hungary

[21] Appl. No.: 312,115

[22] Filed: Oct. 16, 1981

[30] Foreign Application Priority Data

Oct. 17, 1980 [HU] Hungary .................................. 2522

[51] Int. Cl.³ ............................................. C08G 59/00
[52] U.S. Cl. ..................................................... 536/103
[58] Field of Search ......................................... 536/103

[56] References Cited

U.S. PATENT DOCUMENTS

| | | | |
|---|---|---|---|
| 4,054,736 | 10/1977 | Hayashi et al. | 536/103 |
| 4,073,931 | 2/1978 | Akito et al. | 424/279 |
| 4,228,160 | 10/1980 | Szejtli et al. | 536/103 |
| 4,255,249 | 3/1981 | Shibanai et al. | 208/11 R |
| 4,274,985 | 6/1981 | Szejtli et al. | 525/54.2 |

FOREIGN PATENT DOCUMENTS 50-36422  4/1975  Japan.

OTHER PUBLICATIONS

Article entitled "Crystalline Hydrogen Halide Complexes of Cyclodextrins", by J. Szejtli and Zs. Budai, pp. 383–390.
Dexter French, Advances in Carbohydrate Chemistry, vol. 12, (Academic Press, 1957), pp. 247–252.
Szejtli, J. and Budai, Zs., Acta Chimica Hungaricae, 1977, 94, (No. 4), pp. 383–390.

*Primary Examiner*—A. Lionel Clingman
*Attorney, Agent, or Firm*—Karl F. Ross

[57] ABSTRACT

Inclusion complexes of cyclodextrin and strong inorganic oxy acids are disclosed as well as a process for the preparation of the complexes. The complexes are useful for analytical purposes, internal buffering, introducing acids into anhydrous media, substitutions or introduction of radicals, or as catalysts.

13 Claims, No Drawings

INCLUSION COMPLEXES OF CYCLODEXTRINS AND STRONG INORGANIC OXY-ACIDS AND PROCESS FOR THEIR PREPARATION

FIELD OF THE INVENTION

This invention relates to inclusion complexes of cyclodextrins and strong inorganic oxy-acids and a process for the preparation of such complexes. These complexes are storable, stable, crystalline compounds.

BACKGROUND OF THE INVENTION

The strong inorganic oxy-acids are very hygroscopic and labile in pure form whether they are crystalline—such as the phosphoric acids—or liquid—such as sulfuric acid and nitric acid—. So these acids are stored or applied almost only in their aqueous solutions.

In practice there is a need for such oxy-acids which are solid, not hygroscopic and storable as such or in mixtures with materials compatible with the acids from which the inorganic oxy-acids can be released by the effect of water or by a relatively strong heating.

The inclusion complexes of inorganic oxy-acids and cyclodextrins according to our invention comply with the requirements of stability and storage and at the same time the effect of the included oxy-acid comes into full display either in the presence of water used for the dissociation of the inclusion complex or in the absence of water by reaching the temperature necessary for decomposing the cyclodextrin structure.

The Hungarian patent No. 172 936 describes the preparation of inclusion complexes of hydrogen halides and cyclodextrins. The essence of this process is that an aqueous solution of a hydrogen halide is mixed with an aqueous solutions of a cyclodextrin while cooling and the inclusion complex of the hydrogen halide and the cyclodextrin so obtained is crystallized by cooling. In this way cyclodextrin complexes with other acids—such as oxy-acids—either cannot be produced or can be obtained only in a very low yield.

Because of attack by strong acids the glycoside bonds of cyclodextrins will be hydrolized (Acta Chim. Hung., 94, 375 (1977)). So in aqueous solutions, depending on the concentration of the acids, the inorganic oxy-acids either cause the hydrolysis of cyclodextrins (in relatively dilute aqueous solutions) or decompose them if the system contains a small amount of water. In any event the inorganic oxy-acids increase the water solubility of cyclodextrins so complexes do not separate from these solutions.

OBJECT OF THE INVENTION

The object of our invention is to provide crystalline, stable inclusion complexes (cyclodextrin complexes) of inorganic oxy-acids can be obtained.

DESCRIPTION OF THE INVENTION

It has surprisingly been found that the aggressive hydrolysis or decomposition caused by the inorganic oxy-acids can be suppressed.

The present invention is based on our discovery that the inclusion complexes of inorganic oxy-acids and cyclodextrins can be obtained by the proper choice of the acid concentration and that of the temperature whereby solid, crystalline cyclodextrin is converted into the acid complex without having been dissolved.

The crystal structure of the inclusion complexes of strong anorganic oxy-acids and cyclodextrins is different from that of the cyclodextrins, so when the surface molecular layers of the cyclodextrin crystals form a complex, they separate from the cyclodextrin crystal and a new crystal structure begins to form. Thus the crystal structure characterizing the cyclodextrin disappears but without dissolving in water during stirring in a short time and in its place a new crystal structure appears which is characteristic for the inclusion complex of the inorganic oxy-acid and the cyclodextrin.

According to the present invention the solid $\alpha$-, $\beta$- or $\gamma$-cyclodextrin or a mixture of said cyclodextrins and linear dextrins containing at least 60% by weight of cyclodextrin is reacted while stirring with 0.24 to 4 ml of a 30 to 85% by weight aqueous phosphoric acid solution or a 30 to 75% by weight aqueous sulfuric acid solution or a 20 to 65% by weight aqueous nitric acid solution at a temperature between $-5°$ C. and $+25°$ C., for each 1 g of the cyclodextrin. From the solid complex obtained the water is removed by filtration and/or drying.

When in the process of the invention the amount of the acid applied is increased compared to the amount of the cyclodextrin, the effective acid content of the inclusion complex thus formed, i.e. the incorporation rate is also increased; above the given concentration, however, an excess of the acid results in a decreased yield.

The acid complexes according to our invention can be used for analytical purposes, internal buffering, introducing acids into anhydrous media, substitution or introduction of radicals or as catalysts. The effectiveness of fire powders can be multiplied when 5 to 10% by weight of a cyclodextrin-acid complex is added to the common mixtures. So the effectiveness of fire powders can be increased as well as the amount of the powder applied can be significantly reduced, i.e. in case of the same extinguisher-filling quantity more standard fire can be extinguished than without the addition of the complex.

Further details of the present invention are illustrated by the following Examples which are given for illustration but not for limitation of our invention.

EXAMPLE 1

50 g of crystalline $\beta$-cyclodextrin is homogenized with 50 ml of a 40% by weight aqueous phosphoric acid solution cooled to 0° C. to a paste by intensive rubbing in a rub mortar. The paste so obtained is still pourable and easily filterable. The crystals obtained are filtered cold on a glass filter No G3 then dried in a drying oven at 60° C.

43 g of a white, crystalline material are obtained, which is the inclusion complex of $\beta$-cyclodextrin and phosphoric acid. The phosphoric acid content of the product is 7.1% determined by alaklimetric assay.

The product is crystalline on the basis of the powder diagram obtained by X-ray diffraction as well as a complex as proved by thermoanalytic tests. The incorporation rate is 1 mole/1 mole.

The product can be stored without any discoloration or decomposition for more than 6 months at ambient temperature, for more than 1 month at 40° C. and for three weeks at 60° C. The product is slightly discolored after a week at 80° C.

EXAMPLE 2

40 g of crystalline β-cyclodextrin is homogenized well with 10 ml of 40% by weight phosphoric acid cooled to 0° C. by intensive rubbing in a rub mortar then dried in a drying oven at 60° C. 44 g of the β-cyclodextrin-phosphoric acid inclusion complex are obtained which has a phosphoric acid content of 10% by weight and the incorporation rate is 1.4 moles/mole.

EXAMPLE 3

10 g of γ-cyclodextrin is homogenized with 10 ml of 70% by weight phosphoric acid of 0° C. by intensive rubbing in a rub mortar, filtered and dried in a drying oven at 50° C. 1.5 g of the γ-cyclodextrin-phosphoric acid inclusion complex are obtained which has an acid content of 9.5% and the incorporation rate is 1.4 moles/mole.

EXAMPLE 4

10 g of α-cyclodextrin is homogenized with 2.5 ml of 30% by weight phosphoric acid of 0° C. in a rub mortar then dried in drying oven at 60° C. 10.8 g of the α-cyclodextrin-phosphoric acid inclusion complex are obtained which has a phosphoric acid content of 7.5% and the incorporation rate is 0.83 moles/mole.

EXAMPLE 5

By repeating the procedure described in Example 1 but substituting 33% by weight sulfuric acid for the phosphoric acid, 47.5 g of a white, crystalline material, the β-cyclodextrin-sulfuric acid inclusion complex are obtained. The sulfuric acid content of the complex thus obtained is 8.2% determined by alkalimetric assay (with potassium hydroxide). The incorporation rate is 1 sulfuric acid/mole β-cyclodextrin.

The complex is crystalline on the basis of the powder diagram and is stable according to the thermoanalytic tests.

EXAMPLE 6

10 g of γ-cyclodextrin is homogenized with 2.6 ml of 60% by weight sulfuric acid cooled to −5° C. in a rub mortar then the product thus obtained is dried in a vacuum drier at 50° C. 11.8 of the γ-cyclodextrin-sulfuric acid inclusion complex are obtained which has a sulfuric acid content of 15% and the incorporation rate is 2.5 moles/mole.

EXAMPLE 7

10 g of α-cyclodextrin is homogenized with 10 ml of 32% by weight sulfuric acid, the product is filtered then dried in a vacuum exsiccator at ambient temperature. 6.5 g of the α-cyclodextrin-sulfuric acid inclusion complex are obtained which has a sulfuric acid content of 4.5% and the incorporation rate is 0.5 moles/mole.

EXAMPLE 8

10 g of α-cyclodextrin is homogenized with 3 ml of 65% by weight nitric acid and the product thus obtained is dried in a vacuum exsiccator at ambient temperature. 10.8 g of the α-cyclodextrin-nitric acid inclusion complex are obtained which has a nitric acid content of 4.1% and the incorporation rate is 0.7 moles/mole.

EXAMPLE 9

By repeating the procedure described in Example 1 but substituting a 65% by weight nitric acid for the phosphoric acid, 35 g of a white, crystalline material, the β-cyclodextrin-nitric acid inclusion complex are obtained. The nitric acid content of the complex is 5.7% and the incorporation rate is 1.2 moles/mole.

Stability: the nitric acid content is decreased by less than 10% after two weeks at ambient temperature or after 4 days at 40° C. in vacuo.

EXAMPLE 10

20 g of β-cyclodextrin and 10 ml of 20% by weight nitric acid of 0° C. are mixed quickly, filtered cold and dried in a vacuum exsiccator over solid potassium hydroxyide at ambient temperature. 12 g of the β-cyclodextrin-nitric acid inclusion complex are obtained which has a nitric acid content of 2.8% and the incorporation rate is 0.55 moles/mole.

We claim:

1. An inclusion complex of a cyclodextrin and a strong inorganic oxy-acid.
2. The inclusion complex defined in claim 1 of β-cyclodextrin and phosphoric acid.
3. The inclusion complex defined in claim 1 of γ-cyclodextrin and phosphoric acid.
4. The inclusion complex defined in claim 1 of α-cyclodextrin and phosphoric acid.
5. The inclusion complex defined in claim 1 of β-cyclodextrin and sulfuric acid.
6. The inclusion complex defined in claim 1 of γ-cyclodextrin and sulfuric acid.
7. The inclusion complex defined in claim 1 of α-cyclodextrin and sulfuric acid.
8. The inclusion complex defined in claim 1 of β-cyclodextrin and nitric acid.
9. The inclusion complex defined in claim 1 of α-cyclodextrin and nitric acid.
10. A process for the preparation of an inclusion complex of a cyclodextrin and a strong inorganic oxy-acid which comprises reacting a solid α-, β- or γ-cyclodextrin or a mixture of one of said cyclodextrins and a linear dextrin containing at least 60% by weight cyclodextrin while stirring with 0.25 to 4 ml (for each gram of cyclodextrin) of
    a 30 to 85% by weight aqueous phosphoric acid solution or
    a 30 to 75% by weight aqueous sulfuric acid solution or
    a 20 to 65% by weight aqueous nitric acid solution of a temperature between −5° C. and +25° C.
11. Process according to claim 10 wherein the cyclodextrin used is the α-cyclodextrin.
12. Process according to claim 10 wherein the cyclodextrin used is the β-cyclodextrin.
13. Process according to claim 10 wherein the cyclodextrin used is the γ-cyclodextrin.

* * * * *